United States Patent [19]
Lysenko et al.

[11] Patent Number: 5,225,515
[45] Date of Patent: Jul. 6, 1993

[54] POLY(ARYL ETHER) POLYMERS CONTAINING PERFLUOROCYCLOBUTANE RINGS

[75] Inventors: Zenon Lysenko; William J. Harris, both of Midland, Mich.

[73] Assignee: The Dow Chemical Company, Midland, Mich.

[21] Appl. No.: 686,735

[22] Filed: Apr. 17, 1991

[51] Int. Cl.$^5$ .................... C08G 8/02; C08F 14/18
[52] U.S. Cl. .................... 528/125; 526/242; 526/243; 526/245; 526/247; 526/248; 526/250; 526/251; 526/252; 526/253; 526/255; 528/126; 528/128; 528/171; 528/174; 528/220; 528/226; 568/669
[58] Field of Search ............ 528/86, 125, 126, 128, 528/171, 174, 220, 226; 526/242, 243, 245, 248, 250, 251, 252, 253, 255, 247; 568/669

[56] References Cited

U.S. PATENT DOCUMENTS

| | | | |
|---|---|---|---|
| 5,021,602 | 6/1991 | Clement et al. | 558/230 |
| 5,023,380 | 6/1991 | Babb et al. | 568/34 |
| 5,037,917 | 8/1991 | Babb et al. | 526/242 |
| 5,037,918 | 8/1991 | Babb et al. | 526/242 |
| 5,037,919 | 8/1991 | Clement et al. | 526/242 |
| 5,066,746 | 11/1991 | Clement et al. | 526/242 |

FOREIGN PATENT DOCUMENTS

| | | |
|---|---|---|
| 8602368 | 4/1986 | PCT Int'l Appl. |
| 8904464 | 10/1989 | PCT Int'l Appl. |
| 9015042 | 12/1990 | PCT Int'l Appl. |
| 9015044 | 12/1990 | PCT Int'l Appl. |
| 9015082 | 12/1990 | PCT Int'l Appl. |

OTHER PUBLICATIONS

Ueda et al., "Synthesis of Polyketones by Direct Polycondensation of Dicarboxylic Acid with Diaryl Compounds Using Phosphorous Pentoxide/Methane Sulfonic Acid as Condensing Agent and Solvent," 5 Makromol. Chem., Rapid Comm. 833 (1985).

Ueda, "Synthesis of Poly(Phenylene Ether Sulfone) by Direct Self-Polycondensation of Sodium 4-Phenoxy Benzene Sulfonate Using Phosphorous Pentoxide/Methane Sulfonic Acid as Condensing Agent and Solvent," 6 Makromol. Chem., Rapid. Comm. 271 (1985).

Colquhoun, "Synthesis of Polyether Ketones in Trifluoromethane Sulfonic Acid," 25 (2) Polymer Preprints 17-18 & Table II (1984).

Colquhoun et al., "Synthesis of Aromatic Polyether Ketones in Trifluoromethane Sulfonic Acid," 29 Polymer 1902 (1988).

12 Encyclopedia Poly. Sci. & Eng., *Polyetherketones*, at 313-320 (1988).

13 Encyclopedia Poly. Sci & Eng., *Polysulfones*, at 196-211 (1988).

Harris et al., U.S. Ser. No. 407,973 (filed Sep. 15, 1989).

*Primary Examiner*—John Kight, III
*Assistant Examiner*—Shelley A. Dodson

[57] ABSTRACT

Polybenzazole polymers may contain perfluorocyclobutane rings to provide a flexible moiety which is stable at high temperatures.

16 Claims, No Drawings

POLY(ARYL ETHER) POLYMERS CONTAINING PERFLUOROCYCLOBUTANE RINGS

STATEMENT OF GOVERNMENT INTEREST

This invention was made with Government support under contract F33615-86-C-5068 awarded by the Department of the Air Force. The Government has certain rights in this invention.

BACKGROUND OF THE INVENTION

The invention relates to the art of poly(aromatic ether ketone) (PEK) polymers and poly(aromatic ether sulfone) (PES) polymers and copolymers thereof.

PEK polymer and PES polymers (hereinafter collectively referred to as poly(aromatic ethers) ordinarily contain a plurality of repeating mer units represented by either Formula 1(a) or Formula 1(b):

(a) 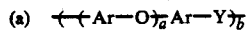

(b) 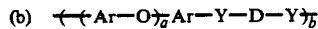

wherein
each Ar is independently an aromatic group;
each Y is independently a sulfonyl moiety or a carbonyl moiety;
each D is a divalent moiety which is not electron-withdrawing, such as an aromatic group;
each "a" represents a number of repeating aryloxy moieties equal to at least 1; and
each "b" represents a number of repeating mer units averaging greater than 1.

The polymers illustrated in Formula 1(a) are synthesized by the condensation of a plurality of EN-monomers containing:
(1) a plurality of aromatic groups (Ar) linked by oxygen atoms; and
(2) an acid group bonded to one of the aromatic groups.

The polymers illustrated in Formula 1(b) are synthesized by the condensation of NN-monomers, that contain a plurality of aromatic groups (Ar) linked by oxygen atoms, with EE-monomers, that contain two acid groups linked by a divalent organic moiety which is not substantially electron-withdrawing and which shields each acid group from the deactivating influence of the other.

The structure, properties, synthesis and uses of poly(aromatic ethers) and their copolymers are discussed in numerous references such as in U.S. Pat. Nos. 3,264,536; 4,065,437; 4,252,937; 4,474,932; 4,503,168 and 4,794,155; and in Ueda et al., "Synthesis of Polyketones by Direct Polycondensation of Dicarboxylic Acid with Diaryl Compounds Using Phosphorous Pentoxide/Methane Sulfonic Acid as Condensing Agent and Solvent," 5 Makromol. Chem, Rapid Comm. 833 (1985); Ueda, "Synthesis of Poly(Phenylene Ether Sulfone) by Direct Self-Polycondensation of Sodium 4-Phenoxy Benzene Sulfonate Using Phosphorous Pentoxide/Methane Sulfonic Acid as Condensing Agent and Solvent," 6 Makromol. Chem, Rapid. Comm. 271 (1985); Colquhoun, "Synthesis of Polyether Ketones in Trifluoromethane Sulfonic Acid," 25 (2) Polymer Preprints 17-18 & Table II (1984); Colquhoun et al., "Synthesis of Aromatic Polyether Ketones in Trifluoromethane Sulfonic Acid," 29 Polymer 1902 (1988) Dahl et al., *Aromatic Poly(Ether Ketones) Having Imide, Amide, Ester, Azo, Quinoxaline, Benzimidazole, Benzoxazole or Benzothiazole Groups and Method of Preparation*, PCT Publication 86/02368 (Apr. 24, 1986); Attwood et al., "Synthesis and Properties of Polyaryl Ether Ketones," 20 Poly. Prep. Am. Chem. Soc. 191 (1979); Attwood et al., "Synthesis and Properties of Polyarylether Ketones," 22 Polymer 1096 (1981); and Mullins et al., "The Synthesis and Properties of Poly(Aromatic Ketones)", C27 JMS-Rev. Macromol. Chem Phys. 313 (1987), which are all incorporated herein by reference.

Poly(aromatic ethers) are noted for their high strength, solvent resistance and continuous use temperatures. It would be desirable to obtain a modified poly(aromatic ether) which has a lower glass transition temperature and/or greater chain flexibility without substantially decreasing the strength and temperature stability of the polymer.

SUMMARY OF THE INVENTION

The present invention is a poly(aromatic ether) polymer or copolymer containing perfluorocyclobutane rings in the polymer backbone. The perfluorocyclobutane ring adds flexibility to the polymer chain, and has a high thermal stability. The polymer may be molded into shaped articles which are useful as structural materials and for other purposes.

DETAILED DESCRIPTION OF THE INVENTION

Definitions

The following terms are used repeatedly throughout this application, and have the meaning and preferred embodiments defined herein unless otherwise specified.

Acid group (AG)—a carboxylic acid, a sulfonic acid or a derivative of such an acid, such as a halide or ester, which can react with an aromatic group in the presence of an appropriate catalyst to form a ketone or sulfone moiety bonded to the aromatic group. Acid groups are preferably the acid or acid halide and more preferably a carboxylic acid or carboxylic acid chloride.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carbocyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties (DM). Suitable divalent moieties comprise, for example, an oxygen atom, a sulfur atom, an alkyl group and/or and or a perfluorinated alkyl group. Each aromatic group is preferably a single six-membered ring.

Each aromatic group may contain substituents which do not interfere with polymerization of monomers containing the aromatic group. Examples of preferred substituents include halogens, alkoxy moieties or alkyl groups. More preferred substituents are either an alkyl group having no more than about 6 carbon atoms or a halogen. Most preferably, each aromatic group contains only those substituents specifically called for hereinafter.

Decoupling group (D)—a non-electron-withdrawing divalent moiety that (1) links an acid group or an aromatic group to a deactivating group; and (2) shields the acid group or aromatic group from the influence of the deactivating group sufficiently for the acid group or aromatic group to participate in an aromatic electrophilic substitution (Friedel-Crafts) reaction.

The minimum size of the decoupling group varies depending upon the reactive group that is being shielded and the catalyst used to drive the reaction. Reactions that are catalyzed by Lewis acid catalysts, such as $AlCl_3$, require less decoupling between reactive sites than do reactions that are catalyzed by dehydrating protic acids, such as polyphosphoric acid. Acid groups require less decoupling than aromatic groups. For example, terephthaloyl chloride and diphenyl ether react to form high molecular weight polymers in the presence of $AlCl_3$, but not in a mixture of methanesulfonic acid and $P_2O_5$. On the other hand, oxy-bis-4-(benzoyl chloride) and 1,4-diphenoxybenzene do react to form high molecular weight polymers in a mixture of methanesulfonic acid and $P_2O_5$.

Decoupling groups frequently comprise one or more aromatic groups, ether linkages, thioether linkages, and alkyl moieties. Decoupling groups of the present invention may also comprise a perfluorocyclobutane moiety.

In the presence of a Lewis acid catalyst, the decoupling group linking two acid groups preferably contains an aromatic group or an alkyl group and more preferably contains an aromatic group. The decoupling provided by a single p-arylene moiety (—Ar—) is ordinarily sufficient. The decoupling group linking two aromatic groups preferably contains an alkyl group, ether linkage or thioether linkage. The decoupling group more preferably consists essentially of an alkyl group, ether linkage or thioether linkage, and most preferably is an oxygen atom.

In the presence of a dehydrating protic acid catalyst, the decoupling group linking two acid groups preferably contains two aromatic groups linked by a bond, an alkyl group, an ether linkage or a thioether linkage (represented by —Ar—J—Ar—, wherein J is a bond, —R—, —O— or —S—). The aromatic groups are preferably linked by an ether linkage. In the presence of a dehydrating protic acid catalyst, the decoupling group linking two aromatic groups that participate in the reaction preferably comprises a third aromatic group linked to the other aromatic groups by a bond, an alkyl group, an ether linkage or a thioether linkage (represented by —J—Ar—J—, wherein each J is selected so that at least one J is an alkyl group, an ether linkage or a thioether linkage). Preferably each J is an oxygen atom. Decoupling and suitable decoupling groups are discussed in Colquhoun, "Synthesis of Polyether Ketones in Trifluoromethane Sulfonic Acid," 25 (2) Polymer Preprints 17–18 & Table II (1984); and Colquhoun et al., "Synthesis of Aromatic Polyether Ketones in Trifluoromethane Sulfonic Acid," 29 Polymer 1902 (1988), which are incorporated herein by reference.

EE-monomers—comprise two acid groups linked by a decoupling group. The acid groups and the decoupling group each independently have the meanings and preferred embodiments previously defined. EE-monomers preferably comply with Formula 12(a):

AG—D—AG    12a wherein all characters have the meanings and preferred embodiments previously assigned. EE-monomers reacted with a Lewis acid catalyst are preferably terephthalic acid, isophthalic acid or an acid halide thereof. EE-monomers reacted in a protic acid are preferably bis-(4-benzoic acid), oxy-bis-(4-benzoic acid) and the acid halides of those monomers.

EN-monomers—comprise an acid group and an aromatic group linked by a decoupling group. The acid group, the aromatic group and the decoupling group all have the meanings and preferred embodiments previously defined. EN-monomers preferably conform with Formula 14(a):

AG—D—Ar    14a wherein each character has the meaning and preferred embodiments previously described and at least one J is an oxygen or sulfur atom. The EN-monomer polymerized using a Lewis acid catalyst is preferably 4-phenoxybenzoic acid or an acid halide thereof. The EN-monomer polymerized in a protic acid is preferably phenoxyphenoxybenzoic acid or an acid halide thereof.

NN-monomers—comprise two aromatic groups linked by a decoupling group. The aromatic groups have the meaning and preferred embodiments previously given. The decoupling group has the broad definition previously given. Suitable NN-monomers preferably comply with Formula 13(a):

Ar—D—Ar    13a

The NN-monomer reacted using a Lewis acid catalyst is preferably diphenyl ether. The NN-monomer reacted in a protic acid is preferably m-diphenoxybenzene, p-diphenoxybenzene, p-phenoxybiphenyl or 4,4'-diphenoxybiphenyl.

EE-Monomers Containing Perfluorocyclobutane Moieties

Polymers of the present invention are synthesized by the reaction of EE- and NN-monomers, optionally with EN-monomers, as those monomers are previously described. At least some of the EE-monomers must contain perfluorocyclobutane rings.

EE-monomers that contain perfluorocyclobutane rings preferably comprise:
(1) a perfluorocyclobutane ring;
(2) two oxygen or sulfur atoms bonded to different carbon atoms of the perfluorocyclobutane ring;
(3) two aromatic groups, one bonded to each oxygen or sulfur atom; and
(4) two acid groups, one bonded each aromatic group.

The EE-monomers are preferably represented by the Formula:

2 wherein:
each J is an oxygen or sulfur atom;
each Ar is an aromatic group;
each AG is an acid group; and
the capital F in within the cyclobutane ring indicates that the ring is perfluorinated.

Each oxygen or sulfur atom (J) is preferably an oxygen atom. The oxygen or sulfur atoms are preferably bonded to adjacent carbon atoms, i.e., in 1,2-position.

Each aromatic group (Ar) has the meaning and preferred embodiments previously defined. It is most preferably an m- or p-phenylene moiety.

Each acid group has the meaning and preferred embodiments previously defined. It is preferably not ortho to the oxygen or sulfur atom (J). It is more preferably meta or para to the oxygen or sulfur atom (J), and most preferably para to the oxygen or sulfur atom (J).

Examples of preferred EE-monomers include 1,2-bis-(oxy-4-benzoic acid)-perfluorocyclobutane; 1,2-bis-(oxy-3-benzoic acid)-perfluorocyclobutane and acid halides thereof.

The monomers are synthesized by a three-step process from an activated phenol. The activating substituent is a lower alkyl carboxylate or sulfonate ester moiety. Certain activated phenols are commercially available, such as methyl 3-hydroxybenzoate and methyl 4-hydroxybenzoate. Others can be synthesized by known methods.

In the first step of monomer synthesis the activated phenol reacts with 1,2-dibromo-tetrafluoroethane in an organic solvent in the presence of a strong base such as sodium hydroxide, such that a substituted phenoxy-(or phenylthio)-2-bromo-tetrafluoroethane is formed.

In the second step, the product of step 1 reacts with zinc to form a substituted phenoxy-(or phenylthio)-trifluoro-ethane moiety. The first two steps and their conditions ar described in Chambers, *Fluorine in Organic Chemistry* 97–200 (J. Wiley & Sons 1973), which is incorporated herein by reference.

In the third step, two equivalents of the product of step 2 are heated under conditions such that the trifluoroethane moieties react to form a single equivalent of dimer containing a perfluorocyclobutane moiety. The reaction is ordinarily carried out at about 180° C. The entire synthetic scheme is preferably represented by Formula 5

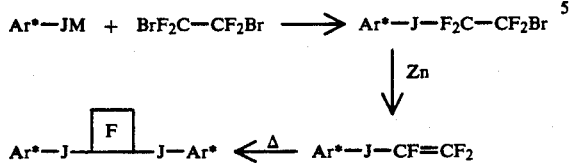

wherein each Ar* is an activated aromatic group having a substituent as previously described.

The diester resulting from step 3 can be converted to the diacid by saponification, as described in Loudon, supra, at 1055–57, which is incorporated herein by reference. The diacid can be used as an EE-monomer or converted to the corresponding acid halide by reaction with thionyl chloride or phosphorus pentachloride, as described in Loudon, supra, at 1014, which is incorporated herein by reference.

Polymers of the Present Invention

The monomers previously described can be used to make poly(aromatic ethers) that contain perfluorocyclobutane moieties.

The polymers are synthesized in the ordinary manner for poly(aromatic ether) polymers, by the reaction of approximate equimolar amounts at least one EE-monomer, containing two acid groups, and at least one NN-monomer, containing two decoupled aromatic groups. At least some of the EE-monomers must contain perfluorocyclobutane moieties, as previously described.

Other suitable monomers are described in numerous references, such as in U.S. Pat. Nos. 4,264,536; 4,065,437; 4,252,937; 4,474,932; 4,503,168 and 4,794,155; and in Ueda et al., "Synthesis of Polyketones by Direct Polycondensation of Dicarboxylic Acid with Diaryl Compounds Using Phosphorous Pentoxide/Methane Sulfonic Acid as Condensing Agent and Solvent," 5 Makromol. Chem, Rapid Comm. 833 (1985); Ueda, "Synthesis of Poly(Phenylene Ether Sulfone) by Direct Self-Polycondensation of Sodium 4-Phenoxy Benzene Sulfonate Using Phosphorous Pentoxide/Methane Sulfonic Acid as Condensing Agent and Solvent," 6 Makromol. Chem, Rapid. Comm. 271 (1985); Colquhoun, "Synthesis of Polyether Ketones in Trifluoromethane Sulfonic Acid," 25 (2) Polymer Preprints 17–18 & Table II (1984); Colquhoun et al., "Synthesis of Aromatic Polyether Ketones in Trifluoromethane Sulfonic Acid," 29 Polymer 1902 (1988); Dahl et al., *Aromatic Poly(Ether Ketones) Having Imide, Amide, Ester, Azo, Quinoxaline, Benzimidazole, Benzoxazole or Benzothiazole Groups and Method of Preparation,* PCT Publication 86/02368 (Apr. 24, 1986); Attwood et al., "Synthesis and Properties of Polyaryl Ether Ketones," 20 Poly. Prep. Am. Chem. Soc. 191 (1979) Attwood et al., "Synthesis and Properties of Polyarylether Ketones," 22 Polymer 1096 (1981); and Mullins et al., "The Synthesis and Properties of Poly(Aromatic Ketones)", C27 JMS-Rev. Macromol. Chem Phys. 313 (1987), which are all incorporated herein by reference.

NN-monomers used to make the poly(aromatic ether) may be, for example: diphenyl ether; 3-phenoxybiphenyl, 4-phenoxybiphenyl; m-diphenoxybenzene; p-diphenoxybenzene and 4,4'diphenoxybiphenyl. EE-monomers which do not contain perfluorocyclobutane moieties may optionally be used to make the poly(aromatic ether); for example: terephthalic acid, isophthalic acid, bis-(4-benzoic acid), oxy-bis-(4-benzoic acid), or 1,4-bis-(phenoxy-4-carboxylic acid)-benzene, the sulfonic acid equivalents thereof, and the acid halides thereof. The reaction mixture may also contain some EN-monomer; for example: 4-phenoxybenzoic acid, phenoxyphenoxybenzoic acid, the sulfonic acid equivalents thereof, and the acid halides thereof.

The reaction mixture preferably contains about equimolar proportions of EE-monomers and NN-monomers. Any unbalance in stoichiometry is preferably no greater than about 8 mole percent. Between 1 and 100 percent of the EE-monomers should contain perfluorocyclobutane moieties. Preferably at least 10 mole percent of the EE-monomers contain perfluorocyclobutane moieties, more preferably at least about 25 percent do, and most preferably at least about 50 percent do. Preferably, no more than about 90 mole percent of the monomers in the reaction mixture are EN-monomers, more preferably no more than about 50 percent are, and most preferably essentially none are. The reaction mixture may also contain a limited amount of monofunctional reagent, such as benzoic acid, benzoyl chloride, benzenesulfonic acid, benzenesulfonyl chloride, or phenoxyphenyl phenyl ketone, to act as a terminator. The terminator preferably makes up no more than about 5 mole percent of the monomers, and more preferably no more than about 2 mole percent of the monomers. The stoichiometry of the EE- and NN-monomers may be offset to provide a polymer or oligomer which is capped by a particular end group an may subsequently be incorporated into block copolymers.

The monomers may be polymerized by one of two alternative reaction mechanisms. First, the monomers may be polymerized in an non-aqueous solvent in the presence of a Lewis acid. The solvent may be, for example, hydrogen fluoride, nitrobenzene, methylene chloride or dichlorobenzene. It is preferably dichlorobenzene. The Lewis acid may be, for example, aluminum chloride, boron trifluoride or antimony pentachloride. It is preferably aluminum chloride. The conditions are those commonly reported for aromatic electrophilic substitution, and are described in Dahl et al., *Aromatic Poly(Ether Ketones) Having Imide, Amide, Ester, Azo, Quinoxaline, Benzimidazole, Benzoxazole or Benzothiazole Groups and Method of Preparation*, PCT Publication WO 86/02368 (Apr. 24, 1986); Attwood et al., "Synthesis and Properties of Polyaryl Ether Ketones," 20 Poly. Prep. Am. Chem. Soc. 191 (1979) and Attwood et al., "Synthesis and Properties of Polyarylether Ketones," 22 Polymer 1096 (1981), which are all incorporated herein by reference. The temperature of the reaction is preferably at least about $-195°$ C. and preferably at most about 150° C. The reaction mixture preferably contains at least about 2 moles of aluminum chloride per mole of EE-monomer and about one mole per mole of EN-monomer.

Second, the monomers may be polymerized in a dehydrating acid solution, such as polyphosphoric acid or a mixture of methanesulfonic acid and phosphorus pentoxide. Monomers polymerized in dehydrating acid ordinarily require greater decoupling than monomers polymerized using a Lewis acid catalyst, as previously described. The reaction typically takes place at a temperature of about 50° C. to about 100° C. The atmosphere is ordinarily inert, such as nitrogen. The concentration of monomer in reaction mixture is preferably at least about 1 weight percent and preferably no more than about 35 weight percent.

Several variations on the reaction and the monomers used therein may be used to produce random, sequential and block copolymers of poly(aromatic ether) and other polymers such as polyamide, polyimide, polyquinoline, polyquinoxaline and/or polybenzazole. Those variations may be practiced using at least some EE-monomers which contain perfluorocyclobutane moieties, to form copolymers containing perfluorocyclobutane moieties.

Several references describe the synthesis and polymerization of EE- and/or NN-monomers that contain amide moieties, imide moieties, quinoline moieties, quinoxaline moieties, benzoxazole moieties, benzothiazole moieties and/or benzimidazole moieties, so that a random or sequential copolymer is formed. Those references include Dahl et al., *Aromatic Poly(Ether Ketones) Having Imide, Amide, Ester, Azo, Quinoxaline, Benzimidazole, Benzoxazole or Benzothiazole Groups and Method of Preparation*, PCT Publication WO 86/02368 (Apr. 24, 1986); Harris et al., *Copolymers Containing Polybenzoxazole, Polybenzothiazole and Polybenzimidazole Moieties*, PCT Publication No. WO 90/03995; and Harris et al., *Copolymers Containing Polybenzazole Mer Units and Poly(Aromatic Ketone) or Poly(Aromatic Sulfone) Mer Units*, Ser. No. 378,360 (filed Jul. 7, 1989), which are incorporated by reference. The formation of polybenzazole/poly(aromatic ether) block copolymers by the reaction of functionally terminated polybenzazole polymers and oligomers with EE- and NN-monomers in dehydrating and non-oxidizing acid is described in Harris et al., *Copolymers Containing Polybenzoxazole, Polybenzothiazole and Polybenzimidazole Moieties*, PCT Publication No. WO 90/03995, which is incorporated herein by reference.

In a preferred embodiment, EE-monomers containing perfluorocyclobutane moieties may be reacted simultaneously or sequentially with NN-monomers suitable to make poly(aromatic ethers) and with monomers suitable to make polybenzazole polymers. That reaction and variations upon it are described in Harris et al., *Copolymers Containing Polybenzoxazole, Polybenzothiazole and Polybenzimidazole Moieties*, PCT Publication No. WO 90/03995; and Harris et al., *Copolymers Containing Polybenzazole Mer Units and Poly(Aromatic Ketone) or Poly(Aromatic Sulfone) Mer Units*, Ser. No. 378,360 (filed Jul. 7, 1989), which are incorporated by reference. Typical monomers suitable to make polybenzazole polymers are 4,6-diaminoresorcinol; 2,5-diaminohydroquinone; 1,4-dithio-2,5-diaminobenzene; and 1,2,4,5-tetraaminobenzene and acid salts thereof (BB-monomers). Ordinarily, the reaction mixture should contain about one mole of EE-monomer per mole of NN- and BB-monomer combined.

The structure of the polymer which results from any of the previously described syntheses reflects the structure of the monomers used to synthesize it. The polymer is a poly(aromatic ether). It has a plurality of repeating moieties that contain a perfluorocyclobutane moiety. The perfluorocyclobutane moiety is joined to the remainder of the polymer by either oxygen atoms or sulfur atoms, which are preferably bonded to the 1 and 2 carbon atoms of the perfluorocyclobutane ring.

Mer units containing perfluorocyclobutane moieties preferably contain:

(1) a plurality of first aromatic groups linked by at least one oxygen atom;
(2) a first sulfonyl or carbonyl group bonded to one of the first aromatic groups;
(3) a second aromatic group bonded to the sulfonyl or carbonyl moiety
(4) a first oxygen or sulfur atom bonded to the second aromatic group;
(5) a perfluorocyclobutane ring bonded to the first oxygen or sulfur atom;
(6) a second oxygen or sulfur atom bonded to the perfluorocyclobutane ring;
(7) a third aromatic group bonded to the second oxygen or sulfur atom; and
(8) a second carbonyl or sulfonyl group bonded to the third aromatic group.

Mer units are preferably linked by a bond from the second carbonyl or sulfonyl group of one mer unit to a first aromatic group of an adjacent mer unit.

Mer units containing perfluorocyclobutane moieties are preferably represented by Formula 10:

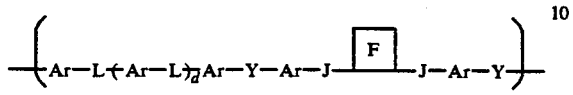

wherein:
each Y is independently a carbonyl or sulfonyl moiety;
each Ar is independently an aromatic group;

each L is an oxygen atom or a bond chosen such that at least one L in each mer unit is an oxygen atom;

each J is independently an oxygen atom or a sulfur atom; and each "d" is a number of repeating units which may average zero or greater for polymers synthesized in an organic solvent with a Lewis acid catalyst or may average about 1 or greater for polymers synthesized in a dehydrating acid.

Each Ar is preferably a meta- or para-phenylene moiety and more preferably a para-phenylene moiety. Each J is preferably an oxygen atom. Each L is preferably an oxygen atom. Each Y is preferably a carbonyl moiety. "d" preferably averages no more than about 10 and more preferably averages no more than about 2.

The mer units are more preferably represented by Formula 11:

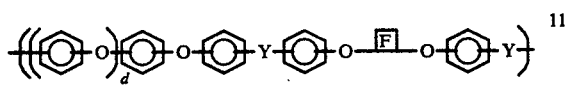

wherein d equals on average about 0 to 1, all bonds to phenyl rings are meta or para with respect to each other and all other terms have the meanings previously assigned.

The mer units are most preferably represented by Formula 12:

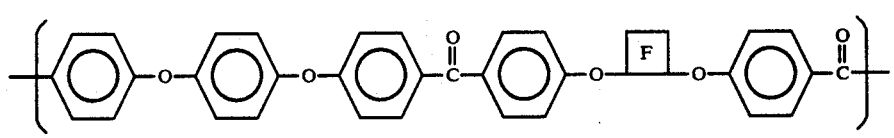

Not all mer units in the polymer need contain perfluorocyclobutane moieties. Mer units which do not are preferably represented by either Formula 13(a) or Formula 13(b)

(a) 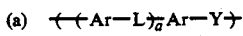

(b) 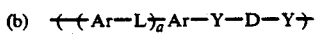

13 wherein:
each Ar is independently an aromatic group;
each Y is independently a sulfonyl moiety or a carbonyl moiety;
each L is an oxygen atom or a bond chosen such that at least one L in each mer unit is an oxygen atom;
each D is a decoupling group as previously described; and
each "a" is a number of repeating units which may be 1 or greater for polymers synthesized in an organic solvent with a Lewis acid catalyst or may average about 2 or greater for polymers synthesized in a dehydrating acid.

Each Ar is preferably a meta- or para-phenylene moiety; each L is preferably an oxygen atom; each Y is preferably a carbonyl moiety; and each "a" preferably averages about 2.

Copolymers synthesized as described previously are poly(aromatic ethers) containing both perfluorocyclobutane moieties and amide, imide, quinoline, quinoxaline, or benzazole moieties. A preferred mer unit is represented by Formula 14:

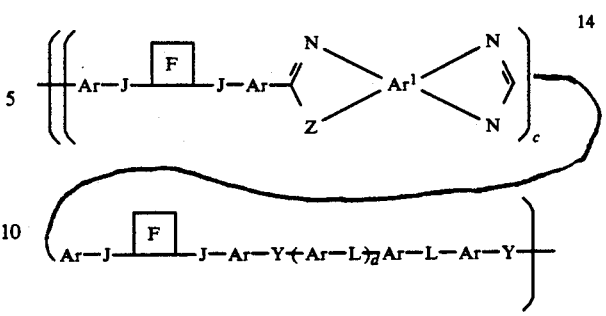

wherein each Z is —O—, —S— or —NR—; R is H or an organic moiety containing no more than about 6 carbon atoms: "c" is a number of repeating units averaging greater than 0; and all other characters have the meaning and preferred embodiment previously defined. Each Z is preferably oxygen or sulfur and more preferably oxygen. "c" preferably averages at least about 0.1, more preferably at least about 0.5, and most preferably at least about 1. "c" preferably averages no more than about 10, more preferably no more than about 3 and most preferably no more than about 1.

Polymers and copolymers of the present invention preferably contain at least 25 mer units, more preferably at least about 50 mer units and most preferably at least about 100 mer units. However, shorter segments, such as containing at least 5 or 10 mer units may be useful in block copolymers. Within the polymer, between 1 and 100 percent of the mer units may contain perfluorocyclobutane moieties. Preferably at least about 5 percent of the mer units contain perfluorocyclobutane moieties, more preferably at least about 10 percent do, more highly preferably at least about 25 percent do, and most preferably at least about 50 percent do.

Polymers containing perfluorocyclobutane moieties have several desirable properties. They are thermoplastic and can be shaped at a temperature above their glass-transition temperatures. They also have good temperature stability. It is also theorized that the polymers are suitable for membrane and electronics applications.

The polymers of the present invention are advantageously illustrated by the following illustrative Examples.

ILLUSTRATIVE EXAMPLES

The following examples are for illustrative purposes only, and should not be taken as limiting the scope of either the specification or the claims. Unless stated otherwise, all parts and percentages are by weight. All inherent viscosities are measured in concentrated sulfuric acid at about 25° C. and 0.2 g/dL concentration using an Ubelobde tube having an internal diameter of about 1.13 mm.

EXAMPLE A

Synthesis of 1,2-bis-(4-oxybenzoic acid) perfluorocyclobutane, and ester and acid halide thereof Step 1—A mixture containing 76.1 g of methyl 4-hydroxybenzoate, 300 ml of anhydrous DMSO, 150 ml of toluene and 61.72 g of potassium t-butoxide is heated while 175 ml of toluene and t-butanol are removed by distillation in the 110° C.-165° C. temperature range. The mixture is allowed to cool to room temperature and 259 g of 1,2-dibromotetrafluoroethane is added dropwise. The mixture is maintained at 70° C. overnight, and then poured into water and stirred. The product is extracted with 1 L of methylene chloride, dried over magnesium sulfate, and recovered by removing the solvent under reduced pressure. The recovered product is a light yellow oil containing 81 percent methyl 4-(2-bromo-tetrafluoroethoxy)-benzoate and 19 percent methyl 4-(tetrafluoroethoxy)-benzoate.

Step 2—A 228 g quantity of the product of Step 1 is added dropwise to a stirred, refluxing mixture containing 1 L of dry dioxane and 45 g of zinc dust under nitrogen. Heating is continued for 2 hours the mixture is cooled to room temperature and then filtered. The solution is diluted with 1 L of water and extracted with four 500 ml positions of water. The organic phase is dried with magnesium sulfate, and the solvent is removed under vacuum. A 103.7 g quantity of pale yellow oil is recovered which contains 77.2 percent methyl 4-(trifluorovinyloxy)benzoate.

Step 3—A mixture of 100 g of product from Step 2 and 250 ml of 1,2,4-trichlorobenzene is heated to 200° C. for four hours. The reaction is cooled to room temperature, and the solvent and unreacted material are removed by distillation at 100° C. and 0.2 mmHg vacuum. The product is distilled at 200° C. and 0.2 mmHg vacuum, and is isolated as a clear colorless oil that solidified on standing. It is recrystallized from hexane. The recovered product is a 45 g quantity of E,Z-1,2-bis-4-(oxy-4-methylbenzoate)perfluorocyclobutane.

A mixture containing 33 g of 2-bis-(oxy-4-methylbenzoate) perfluorocyclobutane, 225 g of methanol, 125 ml of water and 17.2 g of sodium hydroxide is refluxed for six hours. The reaction mixture is cooled and concentrated hydrochloric acid is added to neutralize the mixture. A 37 g quantity of 1,2-bis-(oxy-4-benzoic acid) perfluorocyclobutane is recovered.

A mixture of 30 g of 1,2-bis-(oxy-4-benzoic acid) perfluorocyclobutane, 250 ml of thionyl chloride, and 5 drops of dimethylformamide is refluxed overnight, cooled and filtered. The thionyl chloride is removed under vacuum to yield a yellow oil which solidifies on standing. The solid is recrystallized from hexane, yielding 35 g of E,Z-1,2-bis-(oxy-4-benzoyl chloride) perfluorocyclobutane.

EXAMPLE 1

Polymerization of Para Monomer in Mathanesulfonic Acid

A mixture containing 7.5 g (15.9 mmol) of 1,2-bis-(oxy-4-benzoyl chloride)-perfluorocyclobutane, 4.16 g (15.9 mmol) of 1,4-diphenoxybenzene and 164 g of 10-1 (by weight) methanesulfonic acid/$P_2O_5$ solution is agitated at about 50° C. for about 40 hours under nitrogen atmosphere. The resulting polymer is precipitated in aqueous sodium hydroxide, washed with water and dried under vacuum at 100° C. The resulting polymer is represented by Formula 12. The inherent viscosity is 0.96 dL/g. The polymer shows a glass transition temperature at about 140° C. as measure by differential scanning calorimetry.

EXAMPLE 2

Polymerization of Para Monomer in Polyphosphoric Acid

A mixture containing 2.00 g (4.23 mmol) of 1,2-bis-(oxy-4-benzoyl chloride)-perfluorocyclobutane, 1.11 g (4.23 mmol) of 1,4-diphenoxybenzene and 41.8 g of polyphosphoric acid containing about 83.5 weight percent $P_2O_5$ is agitated at about 60° C. for about 30 minutes under nitrogen atmosphere. A 6.2 g quantity of trifluoracetic acid is added, and the reaction is continued for 15 minutes at 60°. A 1.0 g quantity of trifluoromethanesulfonic acid is added and the reaction is continued for 24 hours at 60° C. and 24 hours at 80° C. The resulting polymer is precipitated in aqueous sodium hydroxide, washed with water and dried under vacuum at 100° C. The resulting polymer is represented by Formula 12. Inherent viscosity of the polymer is 0.82 dL/g.

EXAMPLE 3

Polymerization of Meta Monomer in Methanesulfonic Acid

The process of Example 1 is repeated using 1 80 g (3.81 mmol) of 1,2-bis-(oxy-3-benzoyl chloride)-perfluorocyclobutane; 1.00 g (3.81 mmol) of 1,4-diphenoxybenzene and 60.6 g of 10-1 methanesulfonic acid/$P_2O_5$ solution and a 72 hour reaction time. The resulting polymer consists essentially of mer units represented by Formula 15:

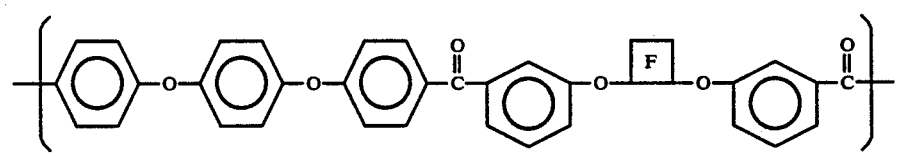

and has an inherent viscosity of 0.11 dL/g.

EXAMPLE 4

Polymerization of Meta Monomer in Trifluoromethanesulfonic Acid

The process of Example 3 is repeated substituting 50 g of trifluoromethanesulfonic acid for the 10-1 methanesulfonic acid/$P_2O_5$ solution. The reaction is continued for 24 hours. The polymer has an inherent viscosity of 0.32 dL/g and a glass transition temperature of about 112° C.

EXAMPLE 5

Polymerization of Para Monomer in Trifluoromethanesulfonic Acid

The process of Example 1 is repeated using 0.90 g (1.9 mmol) of 1,2-bis-(oxy-4-benzoyl chloride)-perfluorocyclobutane; 0.50 g (1.9 mmol) of 1,4-diphenoxybenzene and substituting 30.2 g of trifluoromethanesulfonic acid for the 10-1 methanesulfonic acid/$P_2O_5$ solution. The polymer has an inherent viscosity of 0.89 and a glass transition temperature of about 140° C.

EXAMPLE 6

Synthesis of Poly(Benzoxazole)-(Aromatic Ether Ketone) Copolymer

A mixture containing 4.44 g (9.39 mmol) of 1,2-bis-(oxy-4-benzoyl chloride)-perfluorocyclobutane, 1.00 g (4.69 mmol) of 4,6-diaminoresorcinol bis(hydrochloride) and 60.0 g of 10-1 methanesulfonic acid/$P_2O_5$ solution is agitated under nitrogen atmosphere at about 70° C. for about 2 hours and at about 90° C. for about 16 hours. The mixture is cooled to 50° C., and 1.23 g (4.69 mmol) of 1,4-diphenoxybenzene is added along with 25.7 g of 10-1 methanesulfonic acid/$P_2O_5$ solution. The reaction is continued for 72 hours at 50° C., and then the polymer is recovered as described in Example 1. The resulting copolymer consists essentially of mer units represented by the Formula illustrated in Formula 14 wherein $Ar^1$ is a 1,2,4,5-phenylene moiety having the oxazole rings in cis-position with respect to each other, each Ar is a para-phenylene moiety, d averages about 1 and c averages about 1. (Individual repeating units may contain 0, 1, 2 or more benzoxazole moieties, but the average across the entire polymer is about 1). The copolymer has an inherent viscosity of 0.64 dL/g and a glass transition temperature of 169° C.

What is claimed is:

1. A poly(aromatic ether) polymer or copolymer containing perfluorocyclobutane rings in the polymer backbone.

2. A poly(aromatic ether) polymer or copolymer of claim 1 wherein each perfluorocyclobutane ring is linked to the remainder of the polymer by ether or thioether linkages.

3. A poly(aromatic ether) polymer or copolymer of claim 1 which contains a plurality of mer units that comprise:
   (1) a plurality of first aromatic groups linked by at least one oxygen atom;
   (2) a first sulfonyl or carbonyl group bonded to one of the first aromatic groups;
   (3) a second aromatic group bonded to the sulfonyl or carbonyl moiety
   (4) a first oxygen or sulfur atom bonded to the second aromatic group;
   (5) a perfluorocyclobutane ring bonded to the first oxygen or sulfur atom;
   (6) a second oxygen or sulfur atom bonded to the perfluorocyclobutane ring;
   (7) a third aromatic group bonded to the second oxygen or sulfur atom; and
   (8) a second carbonyl or sulfonyl group bonded to the third aromatic group
wherein each aromatic group contains no more than about 12 carbon atoms.

4. A poly(aromatic ether) polymer or copolymer wherein the first oxygen or sulfur atom and the second oxygen or sulfur atom in each mer unit are bonded to adjacent carbon atoms on the perfluorocyclobutane ring.

5. The poly(aromatic ether) polymer or copolymer of claim 4 that contains a plurality of mer units which are represented by the Formula:

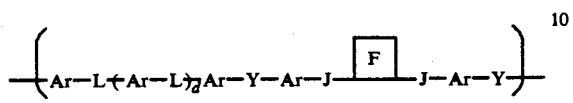

wherein:
   each Y is independently a carbonyl or sulfonyl moiety;
   each Ar is independently an aromatic group;
   each L is an oxygen atom or a bond chosen such that at least one L in each mer unit is an oxygen atom;
   each J is independently an oxygen atom or a sulfur atom; and
   each "d" is a number of repeating units which may averages zero to 10.

6. The poly(aromatic ether) polymer or copolymer of claim 5 wherein d averages 0 to 2.

7. The poly(aromatic ether) polymer or copolymer of claim 5 wherein each aromatic group (Ar) is a meta-phenylene moiety or a para-phenylene moiety.

8. The poly(aromatic ether) polymer or copolymer of claim 7 which consists essentially of mer units that contain perfluorocyclobutane moieties.

9. The poly(aromatic ether) polymer or copolymer of claim 7 which further comprises a plurality of mer units that do not contain a perfluorocyclobutane moiety.

10. The poly(aromatic ether) polymer of claim 7 wherein each carbonyl or sulfonyl group (Y) is a carbonyl group.

11. The poly(aromatic ether) polymer or copolymer of claim 10 wherein a plurality of the mer units are represented by the Formula:

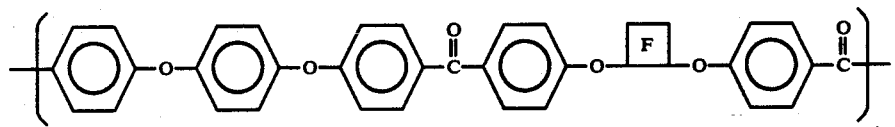

12. The poly(aromatic ether) polymer or copolymer of claim 11 wherein essentially all of the mer units are represented by the Formula in claim 11.

13. The poly(aromatic ether) polymer or copolymer of claim 1 which has an inherent viscosity of at least about 0.8 dL/g in concentrated sulfuric acid at about 25° C. and a concentration of about 0.2 g/dL and has a glass transition temperature of no more than about 150° C.

14. The poly(aromatic ether) polymer or copolymer of claim 1 which further contains a plurality of amide moieties, imide moieties, quinoline moieties, quinoxaline moieties, or benzazole moieties.

15. The poly(aromatic ether) polymer or copolymer of claim 1 which further contains a plurality of benzazole moieties.

16. The poly(aromatic ether) polymer or copolymer of claim 1 which has an inherent viscosity of at least about 0.6 dL/g in concentrated sulfuric acid at about 25° C. and a concentration of about 0.2 g/dL and has a glass transition temperature of no more than about 170° C.

* * * * *